United States Patent
He et al.

(10) Patent No.: US 10,909,417 B2
(45) Date of Patent: Feb. 2, 2021

(54) PROPOSAL PROCESSING METHOD AND RELATED PRODUCTS

(71) Applicant: HANGZHOU FABU TECHNOLOGY CO., LTD., Hangzhou (CN)

(72) Inventors: Xiaofei He, Hangzhou (CN); Abinash Mohanty, Tempe, AZ (US); Yu Cao, Tempe, AZ (US); Yong Xiao, San Diego, CA (US)

(73) Assignee: HANGZHOU FABU TECHNOLOGY CO.. LTD., Hangzhou (CN)

( * ) Notice: Subject to any disclaimer, the term of this patent is extended or adjusted under 35 U.S.C. 154(b) by 53 days.

(21) Appl. No.: 16/409,750

(22) Filed: May 10, 2019

(65) Prior Publication Data

US 2020/0311466 A1    Oct. 1, 2020

Related U.S. Application Data

(63) Continuation of application No. PCT/CN2019/079884, filed on Mar. 27, 2019.

(51) Int. Cl.
*G06K 9/00* (2006.01)
*G06K 9/62* (2006.01)
*G06K 9/32* (2006.01)

(52) U.S. Cl.
CPC ......... *G06K 9/623* (2013.01); *G06K 9/00973* (2013.01); *G06K 9/3233* (2013.01)

(58) Field of Classification Search
CPC combination set(s) only.
See application file for complete search history.

(56) References Cited

U.S. PATENT DOCUMENTS

| | | | |
|---|---|---|---|
| 10,366,301 B1* | 7/2019 | Linzer | G06K 9/4642 |
| 10,713,794 B1* | 7/2020 | He | G06N 3/0454 |
| 2016/0155011 A1* | 6/2016 | Sulc | G06K 9/00671 |
| | | | 382/103 |
| 2017/0169314 A1* | 6/2017 | Dijkman | G06K 9/6261 |
| 2017/0206431 A1 | 7/2017 | Sun et al. | |

(Continued)

FOREIGN PATENT DOCUMENTS

| | | |
|---|---|---|
| CN | 107729808 A | 2/2018 |
| CN | 108460336 A | 8/2018 |

(Continued)

OTHER PUBLICATIONS

The International Search Report of corresponding International application No. PCT/CN2019/079884, dated Jan. 3, 2020.

*Primary Examiner* — Iman K Kholdebarin
(74) *Attorney, Agent, or Firm* — J.C. Patents

(57) ABSTRACT

Provided are a proposals processing method and related products for object detection, where the method comprising: determining a score threshold according to a statistics property of scores of a first quantity of proposal; selecting a second quantity of proposals with a score higher than the score threshold from the first quantity of proposals; and suppressing to the second quantity of proposals to get a third quantity of non-overlapping proposals with high scores, as such, time complexity for selecting a second quantity of proposals is reduced, and efficiency for selection of the proposals to be used for suppression is improved, thereby improving proposal processing efficiency and object detection efficiency.

18 Claims, 8 Drawing Sheets

(56) References Cited

U.S. PATENT DOCUMENTS

| | | | |
|---|---|---|---|
| 2018/0314916 A1* | 11/2018 | Bovyrin | G06K 9/00791 |
| 2019/0026538 A1* | 1/2019 | Wang | G06K 9/4642 |
| 2019/0391578 A1* | 12/2019 | Tariq | G05D 1/0231 |
| 2020/0005075 A1* | 1/2020 | Porter | G06K 9/3233 |

FOREIGN PATENT DOCUMENTS

| | | |
|---|---|---|
| CN | 108537222 A | 9/2018 |
| WO | 2018/184195 A1 | 10/2018 |

\* cited by examiner

PROPOSAL PROCESSING METHOD AND RELATED PRODUCTS

CROSS-REFERENCE TO RELATED APPLICATIONS

This application is a continuation of International Application No. PCT/CN2019/079884, filed on Mar. 27, 2019, entitled "PROPOSAL PROCESSING METHOD AND RELATED PRODUCTS", the content of which is incorporated herein by reference in its entirety.

TECHNICAL FIELD

The present disclosure relates to the technical field of objection detection, and in particular, to a proposal processing method and related products for object detection.

BACKGROUND

Recent advances in object detection are driven by the success of region proposal methods and region-based convolutional neural networks (R-CNNs), which is evolved into fast R-CNN, and further into faster R-CNN. The faster R-CNN object detection system is composed of two modules, one module is a deep fully convolutional network that proposes region by introducing region proposal networks (RPN), and the second module is the fast R-CNN detector that uses the proposed regions.

In the faster R-CNN, an image is input into a convolutional neural network (CNN) to obtain a feature map of the image, and the feature map is further used by the RPN to generate a series of rectangular region proposals. The region proposals generated by the RPN often overlap on a same object, and in order to find all non-overlapping (intersection over union ratio, IoU) proposals with high scores (score>threshold), an algorithm called non-maximum suppression (NMS) is used in object detection neural networks, where score is the probability that the detection is an object and the threshold is minimum probability value for any detection be considered as containing an object. In the state of art, the method to find a third quantity of non-overlapping proposals by using NMS, often includes the two steps: sorting the first quantity of proposals according to their scores, and starting from the top scored box, keep removing boxes with lower scores and high overlap with higher scored box, which is time-costing, and is not suitable for those contexts with higher real time performance requirement.

This background information is provided to reveal information believed by the applicant to be of possible relevance to the present disclosure. No admission is necessarily intended, nor should be construed, that any of the preceding information constitutes prior art against the present disclosure.

SUMMARY

In view of the above, in order to overcome the above problem, the present disclosure provides a proposal processing method and related products.

The foregoing and other objects are achieved by the subject matter of the independent claims. Further implementation forms are apparent from the dependent claims, the description and the figures.

A first aspect the present disclosure relates to a proposal processing method, including:

determining a score threshold according to a statistics property of scores of a first quantity of proposals;

selecting a second quantity of proposals with a score higher than the score threshold from the first quantity of scores; and suppressing to the second quantity of proposals to get a third quantity of non-overlapping proposals with high scores.

A second aspect the present disclosure relates to a proposal processing apparatus, including:

a memory, configured to store program instructions, and a processor, configured to execute the program instructions stored in the memory, to perform:

determining a score threshold according to a statistics property of scores of a first quantity of proposals;

selecting a second proposals with a score higher than the score threshold from the first quantity of scores; and suppressing to the second quantity of proposals to get a third quantity of non-overlapping proposals with high scores.

A third aspect the present disclosure relates to a system on chip, including:

a memory, configured to store program instructions; and a processor, configured to execute the program instructions to perform:

determining a score threshold according to a statistics property of scores of a first quantity of proposals;

selecting a second quantity of proposals with a score higher than the score threshold from the first quantity of proposals; and suppressing to the second quantity of proposals to get a third quantity of non-overlapping proposals with high scores.

A fourth aspect the present disclosure relates to an object detection system, including:

a proposal generator, configured to generate proposals according to an image of an object, wherein each proposal is generated with a score;

the proposal processing apparatus according to the second aspect, configured to process a first quantity of the first quantity of proposals generated by the proposal generator to select a second quantity of proposals from the first quantity of proposals, and output a third quantity of non-overlapping proposals with high scores; and an object detector, configured to detect an object according to the third quantity of non-overlapping proposals with high scores output by the proposal processing apparatus.

The proposal processing method and related products provided in the present disclosure for object detection, by determining a score threshold according a statistics property of scores of a first quantity of proposals, and selecting a second quantity of proposals with score higher than the determined score threshold, a significantly large amount of proposals can be discards, and the suppression to get a third quantity of non-overlapping proposals with high score can be performed efficiently, thereby improving proposals processing efficiency, and reducing time complexity and consumption in object detection system, e.g. faster R-CNN, such that the object detection system may meet higher real time performance requirements in a context such as auto driving.

BRIEF DESCRIPTION OF DRAWINGS

The accompanying drawings are used to provide a further understanding of the present disclosure, constitute a part of the specification, and are used to explain the present disclosure together with the following specific embodiments, but should not be construed as limiting the present disclosure.

DESCRIPTION OF EMBODIMENTS

In the following description, reference is made to the accompanying figures, which form part of the disclosure, and which show, by way of illustration, specific aspects of embodiments of the present disclosure or specific aspects in which embodiments of the present disclosure may be used. It is understood that embodiments of the present disclosure may be used in other aspects and comprise structural or logical changes not depicted in the figures. The following detailed description, therefore, is not to be taken in a limiting sense, and the scope of the present disclosure is defined by the appended claims.

Figure 1:
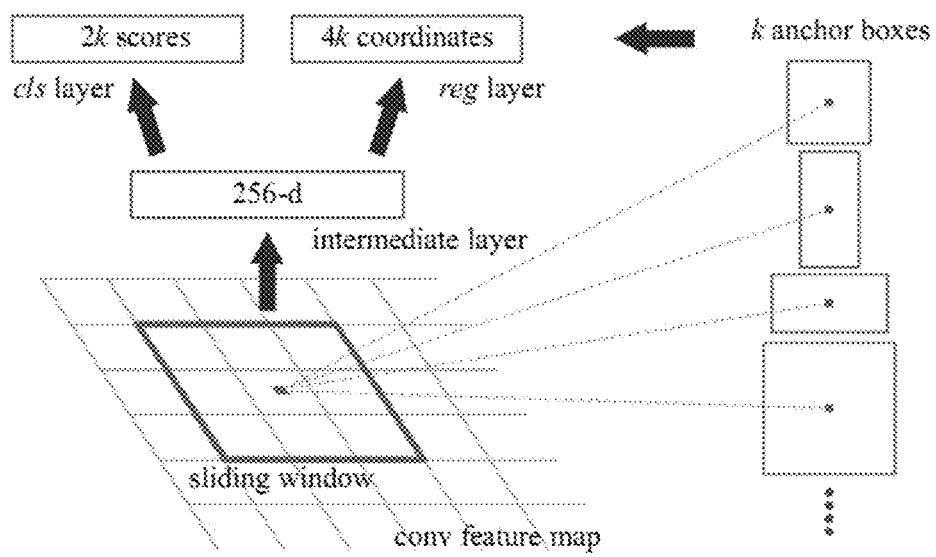
FIG. 1 is a schematic diagram illustrating the RPN in the prior art.

FIG. 1 is a schematic diagram illustrating the RPN in the prior art. The RPN is for proposals generation and is an attention in the Faster R-CNN for object detection. Taking the faster R-CNN as an example, as shown in FIG. 1, in order to generate region proposals, a small network is slided over a convolutional feature map out by a CNN, and the small network takes as input an n×n spatial window of the convolutional feature map. Each sliding window is mapped to a lower dimensional feature (e.g., 256-$d$) in an intermediate layer. This feature is fed into two sliding fully connected layers—a box-regression layer (reg) and a box-classification layer (cls). And, at each sliding window, a plurality of region proposals are simultaneously predicted. For example, as shown in FIG. 1, at each sliding window, a maximum of k region proposals (k anchor boxes as shown in FIG. 1, k is an integer greater than 1) are generated, accordingly, the cls layer outputs 2k scores that estimate probability of object or not object for each proposal, and the reg layer outputs 4k coordinates of the k boxes (proposals).

For an image, there may be tens of thousands of anchors (proposals) generated, and some of the RPN proposals are highly overlapped with each other. To reduce redundancy, NMS is often adopted on the proposal regions based on their cls scores. Using NMS to find a third quantity of non-overlapping proposals, often includes the two steps: firstly, sorting the first quantity of proposals according to their scores, and secondly, starting from the top scored box, keep removing boxes with lower scores and high overlap with higher scored box. The Pseudo-code for the method using NMS is shown below:

```
1:  procedure NMS(box_coordinates,scores,thresh)
2:      Get all box co-ordinates and scores.
3:      Calculate all areas → (x₂ − x₁ + 1) × (y₂ − y₁ + 1)
4:      Sort all boxes according to scores → order = scores.argsort( )[:: −1]
5:      Create an empty list keep → keep = [ ]
6:      while order has elements do
7:          Get the firrst index → i = order[0]
8:          Put the corresponding box in keep array → keep.append(i)
9:          Get overlap x₁ → xx₁ = maximum(x₁[i],x₁[order[1 :]])
10:         Get overlap y₁ → yy₁ = maximum(y₁[i],y₁[order[1 :]])
11:         Get overlap x₂ → xx₂ = maximum(x₂[i],x₂[order[1 :]])
12:         Get overlap y₂ → yy₂ = maximum(y₂[i],y₂[order[1 :]])
13:         Get overlap height → w = np.maximum(0.0,xx₂ − xx₁ + 1)
14:         Get overlap width → h = np.maximum(0.0,yy₂ − yy₁ + 1)
15:         Get overlap area → inter = w × h
16:         Get IoU overlap → ovr = inter/(areas[i] + areas[order[1 :]] − inter)
17:         Get proposals with less overlap → inds = np.where(ovr <= thresh)[0]
18:         Keep proposals with less overlap → order = order[inds + 1]
19:     return keep
```

Supposing the number of a first quantity of proposals is n, the number of top proposals that are used after sorting is t, and the number of non-overlapping proposals with high scores is m, in the method using NMS: time complexity in sorting is O(nlog(n)), time complexity in suppression is O(m×t), and the time complexity in the NMS method is O(nlog(n))+O(m×t). And because the values of m, n and t can be large, using NMS to find a third quantity of non-overlapping proposals with high scores is a bottleneck for real time execution. Also, if proposals are streaming, sorting can take $n^2$ time making the situation even worse. With millions of proposals in neural networks, computation time for NMS can go up to the range of milliseconds to seconds, which cannot meet higher real time performance requirement such as a context of auto driving.

Embodiments of present disclosure provide a proposal processing method for object detection by using e.g. faster R-CNN, which is not limited herein.

Figure 2:
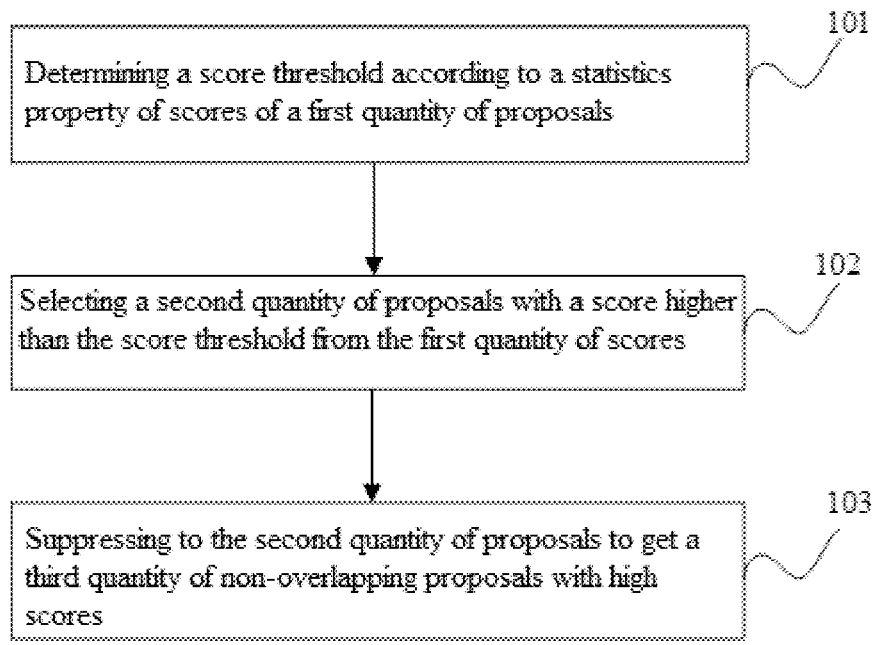
FIG. 2 is a schematic flowchart of a proposal processing method for object detection according to embodiments of present disclosure.

FIG. 2 is a schematic flowchart of a proposal processing method for object detection according to embodiments of present disclosure. As shown in FIG. 2, the proposal processing method for objection may include the following steps:

Step 101, determining a score threshold according to a statistics property of scores of a first quantity of proposals;

Step 102, selecting a second quantity of proposals with a score higher than the score threshold from the first quantity of scores; and Step 103, Suppressing to the second quantity of proposals to get a third quantity of non-overlapping proposals with high scores.

In some embodiments, the first quantity of the proposals may be a first quantity of proposals generated by a proposal generator (e.g., the RPN), the second quantity of proposals may be about 1.5% of the first quantity of the proposals, and the third quantity of proposals often depends on objects in an image. The following takes the first quantity of the proposals as the first quantity of proposals to describe implementations of the present application, for the first quantity of the proposals as a part of the first quantity of proposals, it may follows similar implementations, which will not be repeated herein.

In some embodiments, step 101 includes: determining a score mean of scores of the first quantity of proposals; determining a score standard deviation of the scores of the first quantity of proposals; and determining the score threshold according to the score mean and the score threshold.

In some embodiments, the determining the score threshold according to the score mean and the score threshold, includes: determining the score threshold by using the following equation:

$$\theta = \mu + \beta \times \sigma.$$

In the above equation, $\theta$ is the score threshold, $\mu$ is the score mean, $\sigma$ is the score standard deviation, and $\beta$ is a score factor, which is determined based on a percentage of top scored proposals to be selected for suppression. And in some embodiments, a value of $\beta$ is in a range of 2.5~3.

Figure 2A:
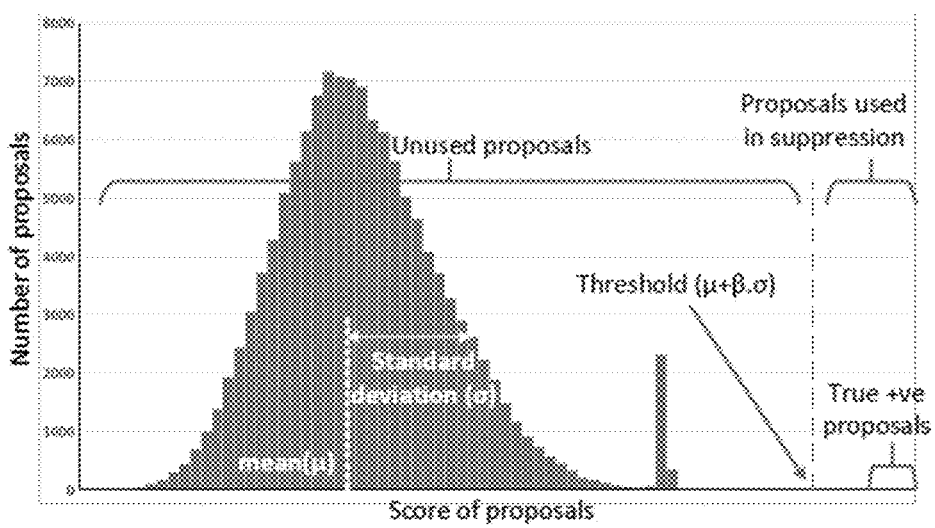
FIG. 2A is a schematic distribution of scores of a first quantity of proposals.

Since more than 95% of a first quantity of proposals correspond to background, it can safely expect most of the scores (background related) to be centered around a negative (−ve) number and a very few scores (associated with ground truth objects) around some positive (+ve) number. In between them is expected to be a smooth and continuous distribution of scores. So the distribution of scores can be considered as sum of two Gaussian, as shown in FIG. 2A: one with a large peak, centered around negative scores, and another one with a small peak, centered around positive scores.

Since the Gaussian corresponding to proposals with true +ve proposals is typically very small compared to true −ve proposals, the sum of the two Gaussian above may be safely assumed to the same as the Gaussian corresponding to true −ve proposals with the true positive proposals lying in the right-side tail of the Gaussian. This may be illustrated using a typical design example as shown in FIG. 2A.

Top scores (e.g. top t scored proposals used for suppression) can be extracted or selected from the first quantity of proposals by exploiting the statistics property of the scores of the first quantity of proposals that they have a Gaussian distribution. Using the mean ($\mu$) and standard deviation ($\sigma$) for the distribution, the top t proposals (for example, top ~1.5% of the first quantity of proposals) can be easily selected by keeping only the proposals with scores above the score threshold $\theta$ given by $\mu+\beta\times\sigma$. Here, $\beta$ is empirically estimated based on the percentage of top scored proposals needed in suppression phase. In some embodiments, the value of $\beta$ in a range of 2.5~3 yields good results.

In some embodiments, first the scores of the first quantity of proposals (e.g., n proposals) are streamed into a hardware, e.g. a processor but not limited thereto, and according to the scores of the first quantity of proposals, computing the score mean and the score standard deviation, and further determine the score threshold according to the score mean and the score standard deviation, as well as the value of $\beta$. This process can be pipelined to process batches of new data every clock cycle and has worst case complexity of O(n). After that the first quantity of proposals are streamed in again, and this time, by comparing the score of each proposal with the score threshold determined, proposals with lower scores are ignored/thrown-away/discarded, thereby selecting the proposals with scores higher than the score threshold determined, and the selection is in O(n) time complexity. Compared to the time complexity in sorting is O(nlog(n)) when using NMS, the time complexity is reduced significantly, especially when the number of the first quantity of proposals (n) is extremely large.

An example rather than a limitation of the Pseudo-code for the step 101 and 102 is shown below:

```
1:  procedure NMS(box_coordinates,scores,nms_threshold,min_area,num_std_dev(β))
2:      for prop_new in all proposals do
3:          Calculate sum of all scores → sum = Σᴺᵢ₌₀ scoreᵢ
4:          Calculate sum of all squared scores → squared_sum = Σᴺᵢ₌₀ scoreᵢ²
5:          Get mean of all scores → = sum/N
6:          Get standard deviation of all scores → σ = √(squared_sum/N − μ²)
7:      Calculate score threshold → θ = μ + β × σ
8:      Instantiate a hardware list → keep = [ ]
9:      for prop_new in all proposals do
10:         if prop_new.score < θ then
11:             Ignore prop_new → GOTO step 9
12:         else
13:             Initialize a counter variable → j = 0
14:             for prop_keep in keep do
15:                 if prop_new.score ≥ prop_keep[j].score then
16:                     Insert prop_new in keep list → keep.insert(prop_new,j)
17:                     Increment counter → j + +
18:                     break → GOTO step 27
19:                 else
20:                     Get IoU overlap between prop_keep[j] and prop_new
21:                     if IoU ≥ nms_threshold or prop_new.area ≤ min_area then
22:                         Ignore prop_new → GOTO step 9
23:                     Increment counter → j + +
24:                 if j < max_keep_size then
25:                     Insert prop_new in keep_list → keep.insert(prop_new,j)
26:                 Get new proposal → GOTO step 9
```

```
27:             if j ≤ keep.size then
28:                 while j ≤ keep.size do
29:                     Get IoU overlap between prop_keep[j] and prop_new
30:                     if IoU ≥ nms_threshold then
31:                         Delete proposal from keep list → keep.delete(j)
32:                     else
33:                         Increment counter → j + +
34:     return keep
```

According to the proposal processing method for objection detection provided in present embodiments, by determining a score threshold according to a statistics property of scores of a first quantity of proposals and selecting a second quantity of proposals with a score higher than the score threshold from the first quantity of proposals, time complexity for selecting a second quantity of proposals is reduced, hence efficiency for selection of the proposals to be used for suppression is improved, which would lead to that proposal processing efficiency is improved.

Figure 3:
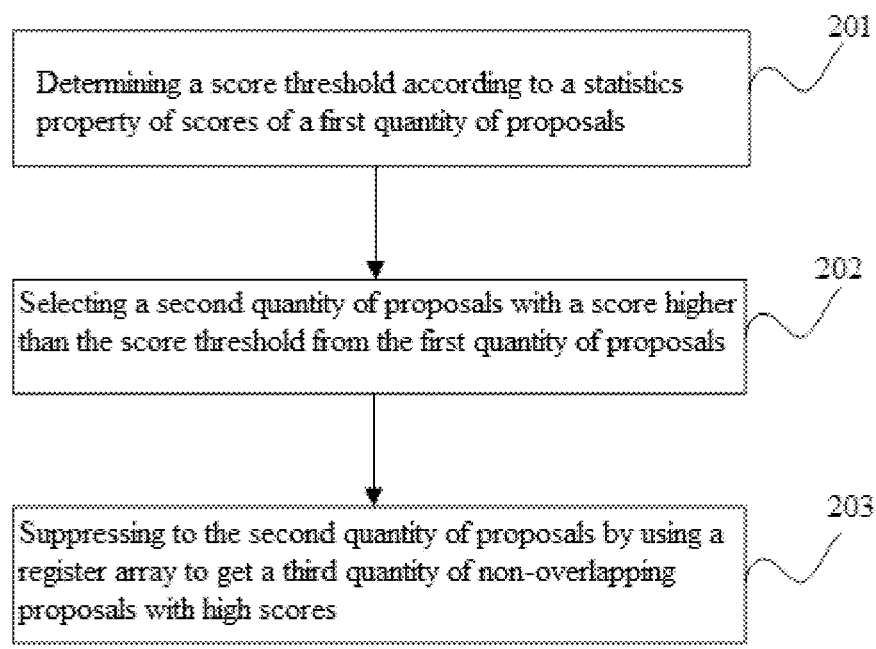
FIG. 3 is another schematic flowchart of a proposal processing method for object detection according to embodiments of present disclosure.

FIG. 3 is another schematic flowchart of a proposal processing method according to embodiments of present disclosure. As shown in FIG. 3, the proposal processing method may include the following steps:

Step 201, determining a score threshold according to a statistics property of scores of a first quantity of proposals;

Step 202, selecting a second quantity of proposals with a score higher than the score threshold from the first quantity of proposals; and Step 203, suppressing to the second quantity of proposals by using a register array to get a third quantity of non-overlapping proposals with high scores.

Step 201 and step 202 are similarly to step 101 and step 102 respectively, which will not be repeated herein. Step 203 is an implementation example of above step 103. In step 203, a hardware register array is adopted to perform unsorted suppression to the second quantity of proposals.

In some embodiments, the register array is a novel O(1) insertion/deletion register array, but not limited thereto. In some embodiments, each register in the register array is connected to two adjacent register, and a score of a proposal of the second quantity of proposals stored in each cell is higher than one adjacent register and is lower than another adjacent register. In some embodiments, each register in the register array comprises a control logic, an instruction port, and a plurality of input ports. In some embodiments, each register in the register array comprises 3 input ports.

Figure 3A:
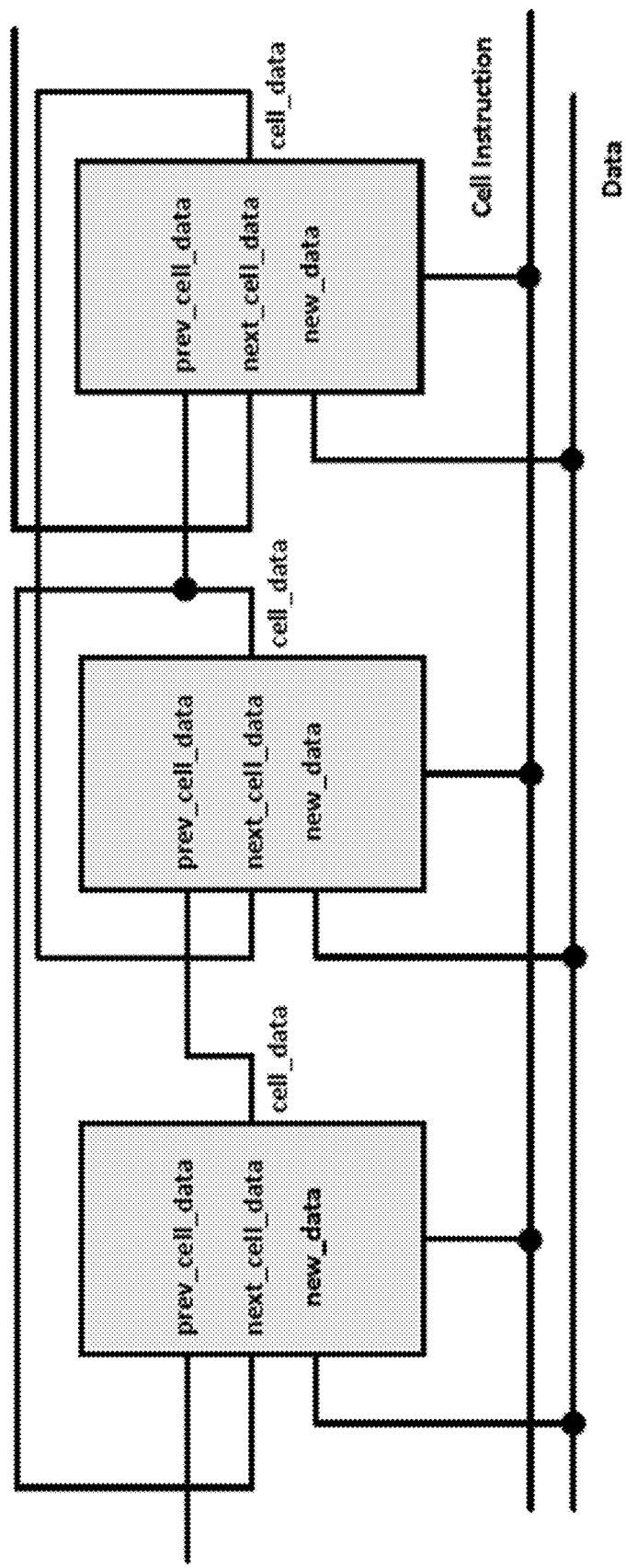
FIG. 3A is a schematic diagram of a register array according to embodiments of present disclosure.

FIG. 3A is a schematic diagram of a register array according to embodiments of present disclosure. The register array has cells to store data. In some embodiments, these cells (registers) are complex registers with control logic embedded in them. The cells have 3 input ports through which they can accept data to store (e.g. data in previous cell, data in next cell, new data). In some embodiments, the data in each cell is a score of one proposals of the second quantity of proposals. The cells also have an instruction port using which an external control logic makes them capture and store inputs from one of the 3 input ports.

As shown in FIG. 3A, the register cell in the register array are in a chain connection, each register cell in the array has 3 input ports: a first input port (prev_cell_data) through which data from its previous cell is received, a second input port (next_cell_data) through which a data from its next cell is received, and a third input port (new_data) through which a new data is inserted; and each register cell has an instruction port to receive instructions. The instruction ports of all cells are connected to e.g. a control bus (a thick line marked as Cell Instruction as shown in FIG. 3A) to receive instructions, and the third input port of all cells are connected to e.g. a data bus (another thick line marked as Data as shown in FIG. 3A) to receive new data.

In some embodiments, each cell is connected to two adjacent cells, (1) previous cell, with higher score and (2) next cell, with lower score. In some embodiments, every clock cycle, the cell in the register array may receive data from 3 sources, i.e., (1) receive data from a previous cell through the first input port, (2) receive data from a next cell through the second input port, and (3) insert new data from a data bus through the third input port.

In some embodiment, each cell is capable of performing the following operations: inserting new data, holding current data, and deleting current data.

In some embodiment, when a cell is inserting new data from the data bus through its third input port (new_data port), a next cell receives data stored in this cell by registering data from its first input port (prev_cell_data port), and a previous cell hold data in itself from previous clock cycle. By multi-casting inserting instruction to at least one next cell, O(1) list insertion is achieved. During this phase, all previous cells in the upstream are multi-casted with an instruction to hold data, this cell gets an instruction to insert new data, and all next cells in the downstream are multi-casted with an instruction to receive data from its previous cell.

In some embodiment, when a cell is holding current data, holding current data may be achieved by registering the current data stored in itself. This does not change data stored in the register array. In some embodiments, an instruction for holding current data is multi-casted across all cells in the array.

In some embodiment, when a cell is deleting current data, the cell receives data stored in its next cell by registering the data from the second input port (next_cell_data port). By multi-casting this instruction to all next cells in the downstream, O(1) list deletion is achieved. During this phase, all previous cells in the upstream of this cell get instruction to hold data.

In some embodiments, the proposals selected in step 201, may be suppressed in step 203 by using the register array as described above, to get a third quantity of non-overlapping proposals with high scores.

To explain the suppression in step 203 by using the register array in detail, taking that there are the second quantity of proposals are 3 proposals (prop.1, prop.2 and prop.3) output from step 202 as an example, and that prop.1 to prop.3 are scored as 0.6, 0.5, and 0.7 respectively in an unsorted order, as an example. It should be noted for other number of selected proposals and each of them are predicted with other scores, the suppression in step 203 may still applied thereto, which would not be limited herein. In some embodiments, for prop.1, the score of prop.1, 0.6 may be stored into a cell of the register array by performing operation of inserting new data; for prop.2, the score of prop.2, 0.5, is first determined as lower than that of prop.1, then determined whether an IoU ratio between prop.2 and prop.1 is higher than a IoU threshold (for example, 0.7, which is often adopted in object detection system in the state of the art, but not limited thereto), when the IoU ratio between prop.2 and prop.1 is higher than the IoU threshold, the prop.2 may be discarded, otherwise, the score of prop.2 may be stored into next cell of the register array by performing operation of inserting new data; for prop.3, the score of prop.3, 0.7, is first determined as higher than that of prop.1, then determined whether an IoU ratio between prop.1 and prop.3 is higher than the IoU threshold, when the IoU ratio between prop.1 and prop.3 is higher than the IoU threshold, the prop.1 stored in the register cell may be discarded by performing the operation of deleting current data, and the prop.3 is stored into the register array by performing the operation of inserting new data, otherwise, the score of prop.3 may be stored into a previous cell of the cell where prop.1 is stored. And when the previous cell is not empty, the operation of storing the score of prop.3 into the previous cell of the cell where prop.1 is stored, may be implemented by that: instructing a next cell of the cell where prop.1 is stored to receive data from its previous cell, and instructing the cell where prop.1 is stored to receive new data, i.e., the score of prop.3.

According to the proposal processing method disclosed in present embodiment, a hardware register array is adopted to performing suppression to unsorted selected proposals, the time complexity is further reduced. The time complexity of the proposal processing method disclosed in present embodiment, for m proposals after selection and t final proposals, is given by:

Time Complexity=$O$(Selection)+$O$(Sorted Suppression), and

Time Complexity Sorted Suppression=$O(m \times t) \times O$(insertion/deletion).

With the proposed hardware register array, the insertion and deletion to the list may be performed in constant time, a worst case time complexity for sorted suppression can be obtained as:

Time Complexity Sorted Suppression=$O(m \times t)$.

With the proposed changes in selection and suppression, the proposal processing may be very efficiently executed on a hardware accelerator (e.g. a deep learning accelerator but not limited thereto) with worst case complexity of $O(n)+O(m \times t)$. Since a custom hardware may be optimized to a lowest level for an application achieving minimal wastage of clock cycles, the proposed hardware can be orders of magnitude higher in performance. For complicated neural networks with large n, the proposal layer in the prior art by using NMS could alone take a few seconds, whereas by using the proposal processing method of present embodiment by using selection and unsorted suppression with hardware register array, the proposal layer may only take a few milliseconds, which improving proposal processing efficiency significantly.

Figure 4:
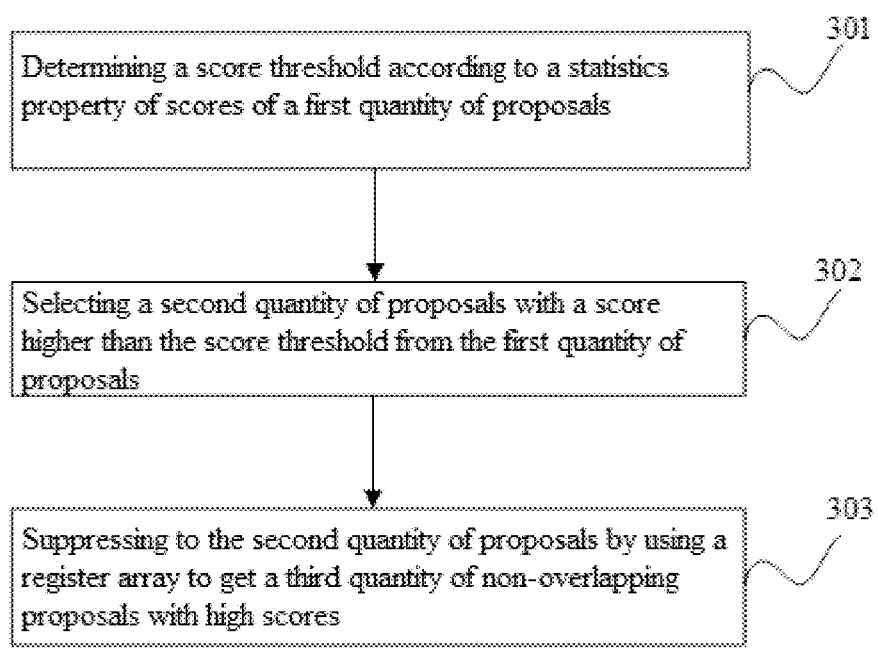
FIG. 4 is yet another schematic flowchart of a proposal processing method for object detection according to embodiments of present disclosure.

FIG. 4 is yet another schematic flowchart of a proposal processing method according to embodiments of present disclosure, as shown in FIG. 4 the proposal processing method includes the following steps:

Step 301, determining a score threshold according to a statistics property of scores of a first quantity of proposals;

Step 302, selecting a second quantity of proposals with a score higher than the score threshold from the first quantity of proposals; and Step 303, Suppressing to the second quantity of proposals by using a register array to get a third quantity of non-overlapping proposals with high scores.

Step 301 and step 302 are similarly to step 101 and step 102 respectively, which will not be repeated herein. Step 303 is another implementation example of above step 103. In step 303, a suppression algorithm is adopted to perform unsorted suppression to the second quantity of proposals.

In some embodiment, the suppression algorithm is a non-maximum suppression algorithm (NMS), but not limited thereto. Taken the NMS as example to explain unsorted suppression for the second quantity of proposals, it should be noted that for other suppression algorithm, it may be still applied herein. By using NMS, the implementation for unsorted suppression is performed by firstly performing sorting to the second quantity of proposals and secondly performing suppression to the sorted selected proposals, the sorting and suppression may refer to the disclosure in related art, such as "https://github.com/bharatsingh430/soft-nms", which will not be repeated herein.

According to proposal processing method disclosed in present embodiment, by determining a score threshold according to a statistics property of scores of a first quantity of proposals and selecting a second quantity of proposals with a score higher than the score threshold from the first quantity of proposals, time complexity for selecting a second quantity of proposals is reduced, hence efficiency for selection of the proposals to be used for suppression is improved, which would lead to that proposal processing efficiency is improved.

Figure 5:
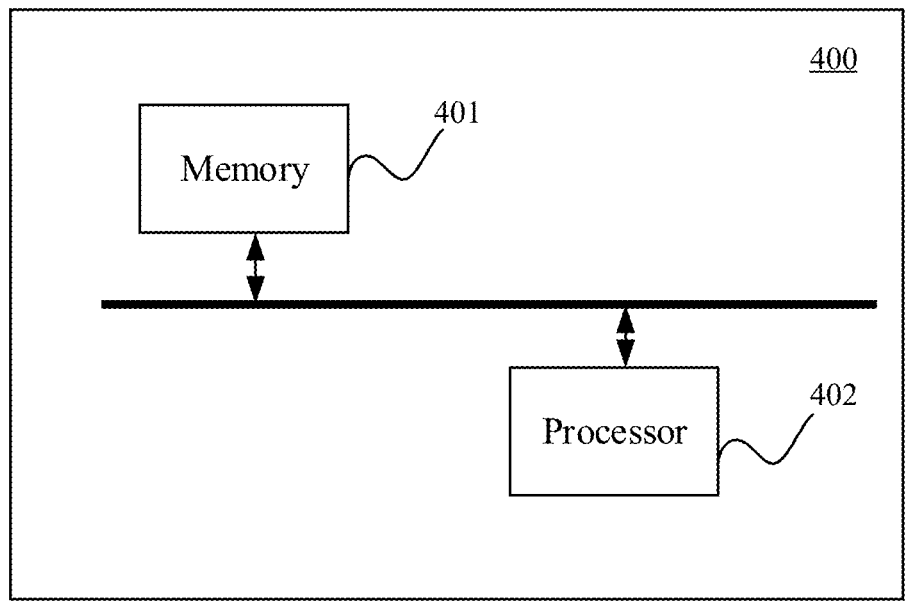
FIG. 5 is a schematic diagram of a proposal processing apparatus for object detection according to embodiments of present disclosure.

FIG. 5 is a schematic diagram of a proposal processing apparatus according to embodiments of present disclosure. As shown in FIG. 5, the proposal processing apparatus 400 includes a memory 401 and a processor 402, where the memory 401 is configured to store program instructions, and the processor 402 is configured to execute the program instructions stored in the memory, to perform: determining a score threshold according to a statistics property of scores of a first quantity of proposals; selecting a second quantity of proposals with a score higher than the score threshold from the first quantity of proposals; and suppressing to the second quantity of proposals to get a third quantity of non-overlapping proposals with high scores.

In some embodiment, the processor 402 is further to configured to execute the program instructions stored in the memory, to perform: determining a score mean of scores of the first quantity of proposals; determining a score standard deviation of the scores of the first quantity of proposals; and determining the score threshold according to the score mean and the score threshold.

In some embodiment, the processor 402 is further to configured to execute the program instructions stored in the memory, to perform: determining the score threshold by using the following equation:

$$\theta = \mu + \beta \times \sigma.$$

In the above equation, $\theta$ is the score threshold, $\mu$ is the score mean, $\sigma$ is the score standard deviation, and $\beta$ is a score factor, which is determined based on a percentage of top scored proposals to be selected for suppression. In some embodiment, a value of $\beta$ is in a range of 2.5~3.

The proposal processing apparatus described herein is configured to implement the method embodiment referred to FIG. 2, following similar implementation principles and producing similar technical effects, which will not be repeated herein.

In some embodiments, the processor 402 is further to configured to execute the program instructions stored in the memory, to perform: suppressing to the second quantity of proposals by using a suppression algorithm to get a third quantity of non-overlapping proposals with high scores. In some embodiments, the suppression algorithm is a non-maximum suppression algorithm.

As such, the proposal processing apparatus described herein is configured to implement the method embodiment referred to FIG. 4, following similar implementation principles and producing similar technical effects, which will not be repeated herein.

Figure 6:
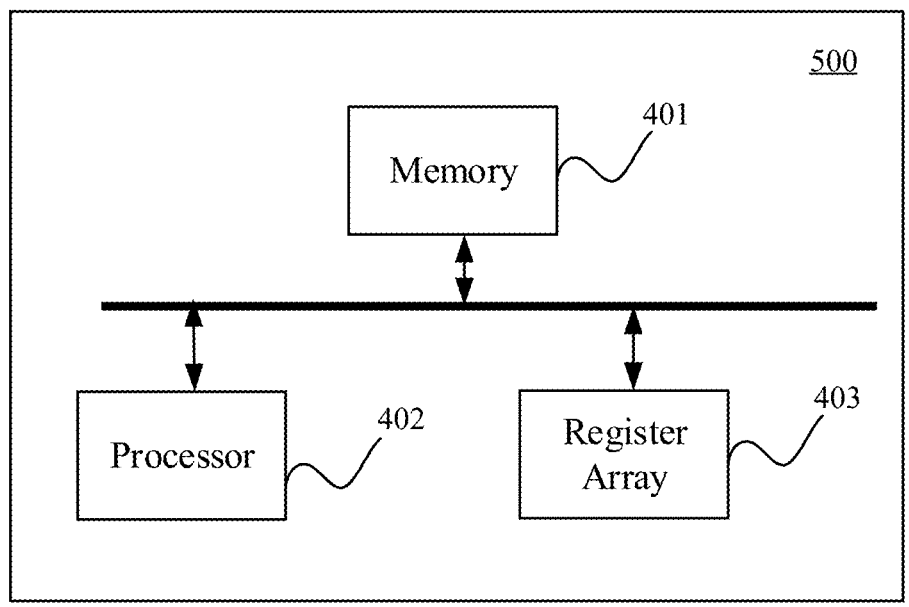
FIG. 6 is another schematic diagram of a proposal processing apparatus for object detection according to embodiments of present disclosure.

FIG. 6 is another schematic diagram of a proposal processing apparatus 500 according to embodiments of present disclosure. As shown in FIG. 6, the proposal processing apparatus 400 includes a memory 401, a processor 402 as described above, and further includes a register array 403.

In some embodiments, the register array 403 is configured to suppress the second quantity of proposals to get a third quantity of non-overlapping proposals with high scores; and the processor 402 is further to configured to execute the program instructions stored in the memory, to perform: suppressing to the second quantity of proposals by using the register array 403 to get a third quantity of non-overlapping proposals with high scores.

In some embodiments, the register array 403 is a novel O(1) insertion/deletion register array, each register in the register array 403 includes a control logic, an instruction port, and a plurality of input ports. In some embodiments, each register in the register array comprises 3 input ports.

The proposal processing apparatus described herein is configured to implement the method embodiment referred to FIG. 3, following similar implementation principles and producing similar technical effects, which will not be repeated herein.

Figure 7:
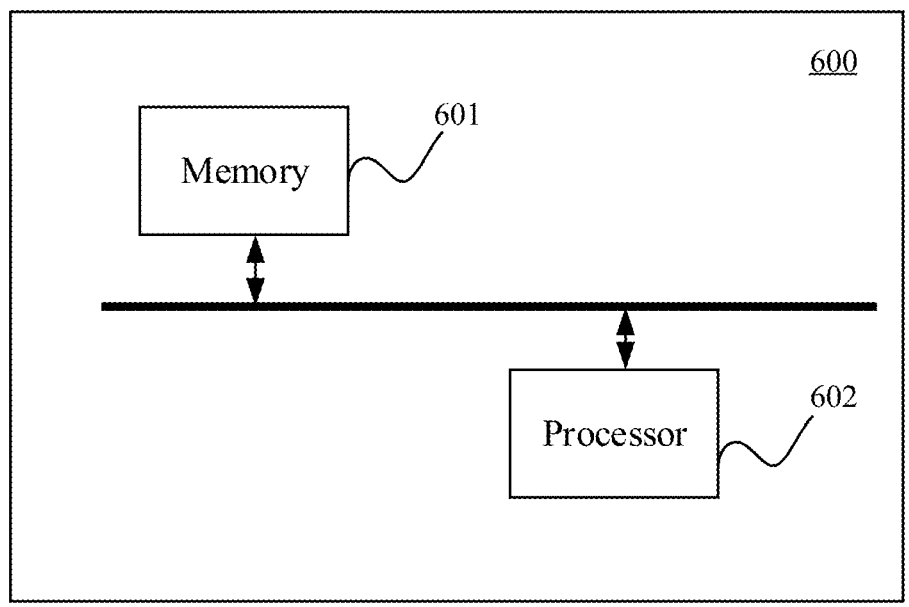
FIG. 7 is a schematic diagram of a system on chip according to embodiments of present disclosure.

FIG. 7 is a schematic diagram of a system on chip according to embodiments of present disclosure. As shown in FIG. 7, the system on chip 600, includes a memory 601 and a processor 602, the memory 601 is configured to store program instructions; and the processor 602 is configured to execute the program instructions to perform: determining a score threshold according to a statistics property of scores of a first quantity of proposals; selecting a second quantity of proposals with a score higher than the score threshold from the first quantity of proposals; and suppressing to the second quantity of proposals to get a third quantity of non-overlapping proposals with high scores.

In some embodiment, the processor 602 is further to configured to execute the program instructions stored in the memory, to perform: determining a score mean of scores of the first quantity of proposals; determining a score standard deviation of the scores of the first quantity of proposals; and determining the score threshold according to the score mean and the score threshold.

In some embodiment, the processor 602 is further to configured to execute the program instructions stored in the memory, to perform: determining the score threshold by using the following equation:

$$\theta = \mu + \beta \times \sigma.$$

In the above equation, $\theta$ is the score threshold, $\mu$ is the score mean, $\sigma$ is the score standard deviation, and $\beta$ is a score factor, which is determined based on a percentage of top scored proposals to be selected for suppression. In some embodiment, a value of $\beta$ is in a range of 2.5~3.

The system on chip described herein is configured to implement the method embodiment referred to FIG. 2, following similar implementation principles and producing similar technical effects, which will not be repeated herein.

In some embodiments, the processor 602 is further configured to execute the program instructions stored in the memory 601, to perform: suppressing to the second quantity of proposals by using a suppression algorithm to get a third quantity of non-overlapping proposals with high scores. In some embodiments, the suppression algorithm is a non-maximum suppression algorithm.

As such, the system on chip described herein is configured to implement the method embodiment referred to FIG. 4, following similar implementation principles and producing similar technical effects, which will not be repeated herein.

Figure 8:
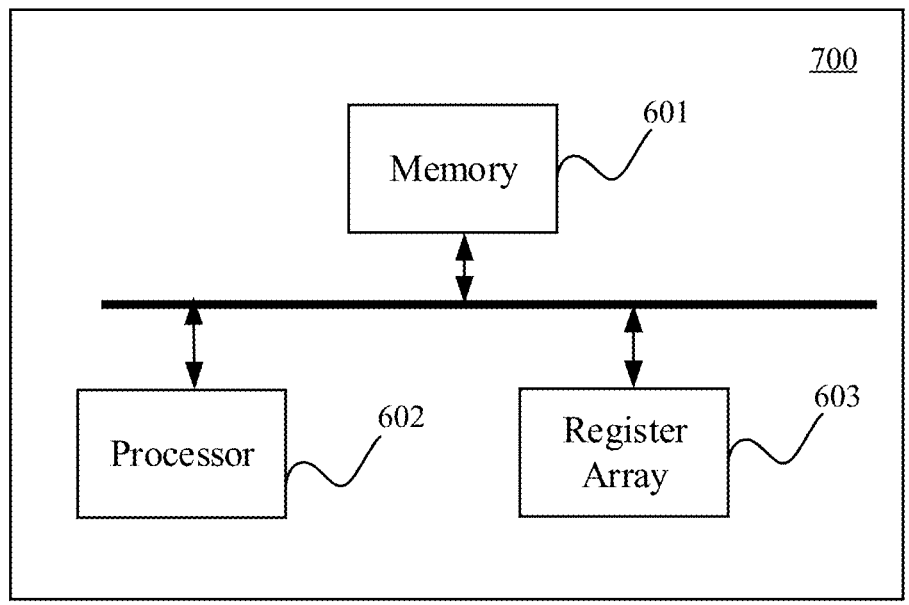
FIG. 8 is another schematic diagram of a system on chip according to embodiments of present disclosure.

FIG. 8 is another schematic diagram of a system on chip according to embodiments of present disclosure. As shown in FIG. 8, the system on chip 700 includes a memory 601 and a processor 602 as described above, and further includes a register array 603.

In some embodiments, the register array 603 is configured to suppress the second quantity of proposals to get a third quantity of non-overlapping proposals with high scores; and the processor 602 is further to configured to execute the program instructions stored in the memory, to perform: suppressing to the second quantity of proposals by using the register array 603 to get a third quantity of non-overlapping proposals with high scores.

In some embodiments, the register array 603 is a novel O(1) insertion/deletion register array, each register in the register array 603 includes a control logic, an instruction port, and a plurality of input ports. In some embodiments, each register in the register array comprises 3 input ports.

The proposal processing apparatus described herein is configured to implement the method embodiment referred to FIG. 3, following similar implementation principles and producing similar technical effects, which will not be repeated herein.

Figure 9:
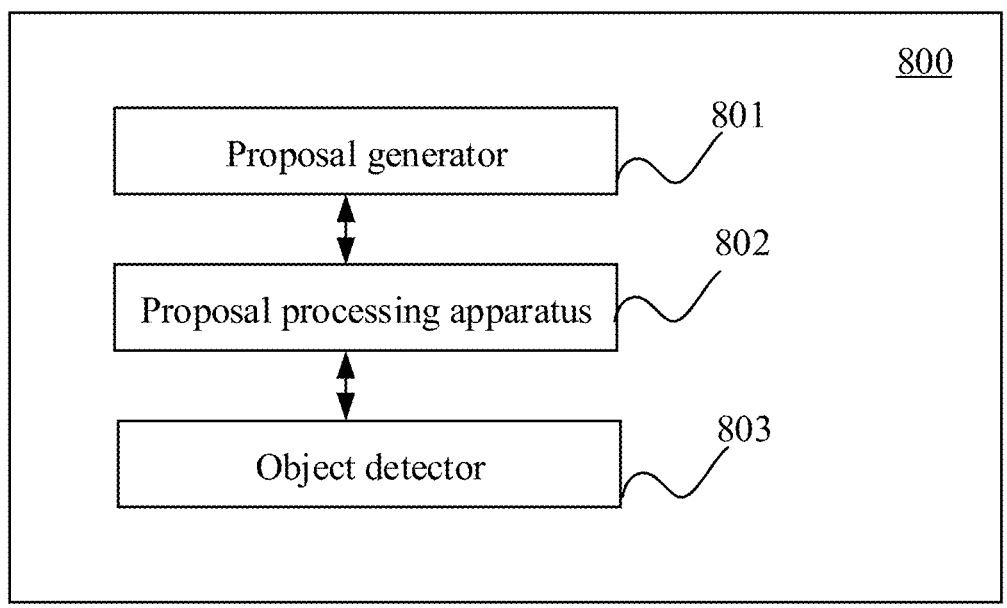
FIG. 9 is a schematic diagram of an objection detection system according to embodiments of present disclosure.

FIG. 9 is a schematic diagram of an objection detection system according to embodiments of present disclosure. As shown in FIG. 9, the object detection system 800 includes a proposal generator 801, an proposal processing apparatus 802, and an object detector 803, where the proposal generator 801 is configured to generate proposals according to an image of an object, wherein each proposal is generated with a score; the proposal processing apparatus 802 is configured to process the first quantity of proposals generated by the proposal generator 801 to select a second quantity of proposals from the first quantity of proposals, and output a third quantity of non-overlapping proposals with high scores by suppressing to the second quantity of proposals; and the object detector 803 is configured to detect an object according to the third quantity of non-overlapping proposals with high scores output by the proposal processing apparatus 802.

The proposal generator 801 may be, for example, an RPN in a faster R-CNN system for object detection, but not limited thereto, and the object detector 803 may be, for example, an fast R-CNN, but not limited thereto, and the proposals processing apparatus 802 may be the proposal processing apparatus 400 and 500 as described above, following similar implementation principles and producing similar technical effects, which will not be repeated herein.

For instance, it is understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Terms such as "first", "second" and the like in the specification and claims of the present disclosure as well as in the above drawings are intended to distinguish different objects, but not intended to define a particular order.

The term such as "and/or" in the embodiments of the present disclosure is merely used to describe an association between associated objects, which indicates that there may be three relationships, for example, A and/or B may indicate presence of A only, of both A and B, and of B only.

The term "a" or "an" is not intended to specify one or a single element, instead, it may be used to represent a plurality of elements where appropriate.

It will be further understood that the terms "comprising", "including", "having" and variants thereof, when used in this specification, specify the presence of stated features, steps, operations, elements, and/or components, but do not preclude the presence or addition of one or more other features, steps, operations, elements, components, and/or groups thereof. In contrast, the term "consisting of" when used in this specification, specifies the stated features, steps, operations, elements, and/or components, and precludes additional features, steps, operations, elements and/or components.

In the embodiments of the present disclosure, expressions such as "exemplary" or "for example" are used to indicate illustration of an example or an instance. In the embodiments of the present disclosure, any embodiment or design scheme described as "exemplary" or "for example" should not be interpreted as preferred or advantageous over other embodiments or design schemes. In particular, the use of "exemplary" or "for example" is aimed at presenting related concepts in a specific manner.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise a random access memory (RAM), a read-only memory (ROM), an electrically erasable programmable ROM (EEPROM), a compact disc ROM (CD-ROM) or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

It will be understood that, when an element or component is referred to herein as "connected to" or "coupled to" another element or component, it can be connected or coupled to the other element or component, or intervening elements or components may also be present. In contrast, when an element or component is referred to as being "directly connected to," or "directly coupled to" another element or component, there are no intervening elements or components present between them.

While the present invention is described herein with reference to illustrative embodiments, this description is not intended to be construed in a limiting sense. Rather, the purpose of the illustrative embodiments is to make the spirit of the present invention be better understood by those skilled in the art. In order not to obscure the scope of the invention, many details of well-known processes and manufacturing techniques are omitted. Various modifications of the illustrative embodiments, as well as other embodiments, will be apparent to those of skill in the art upon reference to the description. It is therefore intended that the appended claims encompass any such modifications.

Furthermore, some of the features of the preferred embodiments of the present invention could be used to advantage without the corresponding use of other features. As such, the foregoing description should be considered as merely illustrative of the principles of the invention, and not in limitation thereof. Those of skill in the art will appreciate variations of the above-described embodiments that fall within the scope of the invention. As a result, the invention is not limited to the specific embodiments and illustrations discussed above, but by the following claims and their equivalents.

The invention claimed is:

1. A proposal processing method, comprising:
   determining a score threshold according to a statistics property of scores of a first quantity of proposals;
   selecting a second quantity of proposals with a score higher than the score threshold from the first quantity of the scores; and
   suppressing to the second quantity of proposals to get a third quantity of non-overlapping proposals with high scores;
   wherein the suppressing to the second quantity of proposals to get the third quantity of non-overlapping proposals with high scores, comprises:
   suppressing to the second quantity of proposals by using a register array to get the third quantity of a third quantity of non-overlapping proposals with high scores.

2. The method according to claim 1, wherein the determining the score threshold according to the statistics property of the scores of the first quantity of proposals, comprises:
   determining a score mean of the scores of the first quantity of the first quantity of proposals;
   determining a score standard deviation of the scores of the first quantity of the first quantity of proposals; and
   determining the score threshold according to the score mean and the score threshold.

3. The method according to claim 2, wherein the determining the score threshold according to the score mean and the score threshold, comprises:
   determining the score threshold by using the following equation:

$$\theta=\mu+\beta+\sigma,$$

wherein $\theta$ is the score threshold, $\mu$ is the score mean, $\sigma$ is the score standard deviation, and $\beta$ is a score factor, which is determined based on a percentage of top scored proposals to be selected for suppression.

4. The method according to claim 3, wherein a value of $\beta$ is in a range of 2.5~3.

5. The method according to claim 1, wherein the register array is a novel O(1) insertion/deletion register array.

6. The method according claim 1, wherein each register in the register array is connected with two adjacent register, and a score of a proposal of the second quantity of proposals stored in each cell is higher than one adjacent register and is lower than another adjacent register.

7. The method according to claim 1, wherein each register in the register array comprises a control logic, an instruction port, and a plurality of input ports.

8. The method according to claim 7, wherein each register in the register array comprises 3 input ports.

9. The method according to claim 1, wherein the suppressing to the second quantity of proposals to get a third quantity of non-overlapping proposals with high scores, comprises:
   suppressing to the second quantity of proposals by using a suppression algorithm to get the third quantity of a third quantity of non-overlapping proposals with high scores.

10. The method according to claim 9, wherein the suppression algorithm is a non-maximum suppression algorithm.

11. A proposal processing apparatus, comprising:
    a memory, configured to store program instructions, and
    a processor, configured to execute the program instructions stored in the memory, to perform:
    determining a score threshold according to a statistics property of scores of a first quantity of proposals;
    selecting a second quantity of proposals with a score higher than the score threshold from the first quantity of scores; and
    suppressing to the second quantity of proposals to get a third quantity of non-overlapping proposals with high scores,
    wherein the proposal processing apparatus further comprises:
    a register array, configured to be used by the processor to suppress the second quantity of proposals to get the third quantity of non-overlapping proposals with high scores; and
    the processor is further to configured to execute the program instructions stored in the memory, to perform:
    suppressing to the second quantity of proposals by using the register array to get the third quantity of non-overlapping proposals with high scores.

12. The apparatus according to claim 11, wherein the processor is further to configured to execute the program instructions stored in the memory, to perform:
    determining a score mean of the scores of the first quantity of proposals;
    determining a score standard deviation of the scores of the first quantity of proposals; and
    determining the score threshold according to the score mean and the score threshold.

13. The apparatus according to claim 12, wherein the processor is further to configured to execute the program instructions stored in the memory, to perform:
    determining the score threshold by using the following equation:

$$\theta=\mu+\beta\times\sigma,$$

wherein $\theta$ is the score threshold, $\mu$ is the score mean, $\sigma$ is the score standard deviation, and $\beta$ is a score factor, which is determined based on a percentage of top scored proposals to be selected for suppression.

14. The apparatus according to claim 13, wherein a value of $\beta$ is in a range of 2.5~3.

15. The apparatus according to claim 11, wherein the register array is a novel O(1) insertion/deletion register array.

16. The apparatus according to claim 11, wherein each register in the register array comprises a control logic, an instruction port, and a plurality of input ports.

17. The apparatus according to claim 16, wherein each register in the register array comprises 3 input ports.

18. An object detection system, comprising:
- a proposal generator, configured to generate proposals according to an image of an object, wherein each proposal is generated with a score;
- the proposal processing apparatus according to claim 11, configured to process a first quantity of the proposals generated by the proposal generator to select a second quantity of proposals from the first quantity of proposals, and output a third quantity of non-overlapping proposals with high scores by suppressing to the second quantity of proposals; and
- an object detector, configured to detect an object according to the third quantity of non-overlapping proposals with high scores output by the proposal processing apparatus.

\* \* \* \* \*